(12) United States Patent
Loen et al.

(10) Patent No.: US 6,542,891 B1
(45) Date of Patent: Apr. 1, 2003

(54) SAFE STRENGTH REDUCTION FOR JAVA SYNCHRONIZED PROCEDURES

(75) Inventors: Larry Wayne Loen, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,559

(22) Filed: Jan. 29, 1999

(51) Int. Cl.[7] .............................................. G06F 12/00
(52) U.S. Cl. ........................ 707/8; 709/104; 710/200; 711/150; 711/204
(58) Field of Search ................................. 709/100, 101, 709/102, 103, 104, 108; 710/200, 33; 707/8; 711/150, 204

(56) References Cited

U.S. PATENT DOCUMENTS 4,574,350 A * 3/1986 Starr .......................... 710/200
5,692,178 A * 11/1997 Shaughnessy ............... 709/108
6,266,716 B1 * 7/2001 Wilson ......................... 710/33

OTHER PUBLICATIONS

Baker, H., "CONS Should not CONS its Arguments, or, a Lazy Alloc is a Smart Alloc", *ACM Sigplan Notices*, vol. 27, No. 3, pp. 24–34 (Mar. 1992).

Baker, Jr., H., "Optimizing Allocation and Garbage Collection of Spaces", *Artificial Intelligence, An MIT Perspective*, vol. 2, pp. 391–396 (1979).

Bozman, G. et al., "Analysis of Free–Storage Algorithms—Revisited", *IBM Systems Journal*, vol. 23, No. 1, pp. 44–64 (1984).

Matsuoka, S. et al., "A Fast Parallel Conservative Garbage Collector for Concurrent Object–Oriented Systems", *IEEE*, pp. 87–93, (1991).

McDowell, C.E., "Reducing Garbage in Java", *ACM SIGPLAN Notices*, vol. 33, No. 9, pp. 84–86 (Sep. 1998).

Monson, L., "Caching & WeakReferences", *JAVA Developer's Journal*, vol. 3, Issue 8, pp. 32–36 (Date Unknown).

Park, Y. et al., "Escape Analysis on Lists", *ACM SIGPLAN '92*, pp. 116–127 (1992).

Smith, L.C., "Software Mechanism to Reuse Object Instances for Improved Performance", *IBM Technical Disclosure Bulletin*, vol. 38, No. 10, pp. 237–241 (Oct. 1995).

Wilson, P. et al., "Dynamic Storage Allocation: A Survey and Critical Review", *Department of Computer Sciences, University of Texas at Austin*, pp. 1–78 (Date Unknown).

* cited by examiner

*Primary Examiner*—Majid Banankhah
(74) *Attorney, Agent, or Firm*—Roy W. Truelson

(57) ABSTRACT

The present invention is a computer implemented method and system for minimizing contention for a shared resource between a plurality of processes executing computer instructions that are associated with said shared resource. The method analyzes at least one of said processes of computer instructions and determines whether at least one of said processes modifies said shared resource. If at least one of said processes does not modify said shared resource, the method controls access to said shared resource by at least one said process.

18 Claims, 5 Drawing Sheets

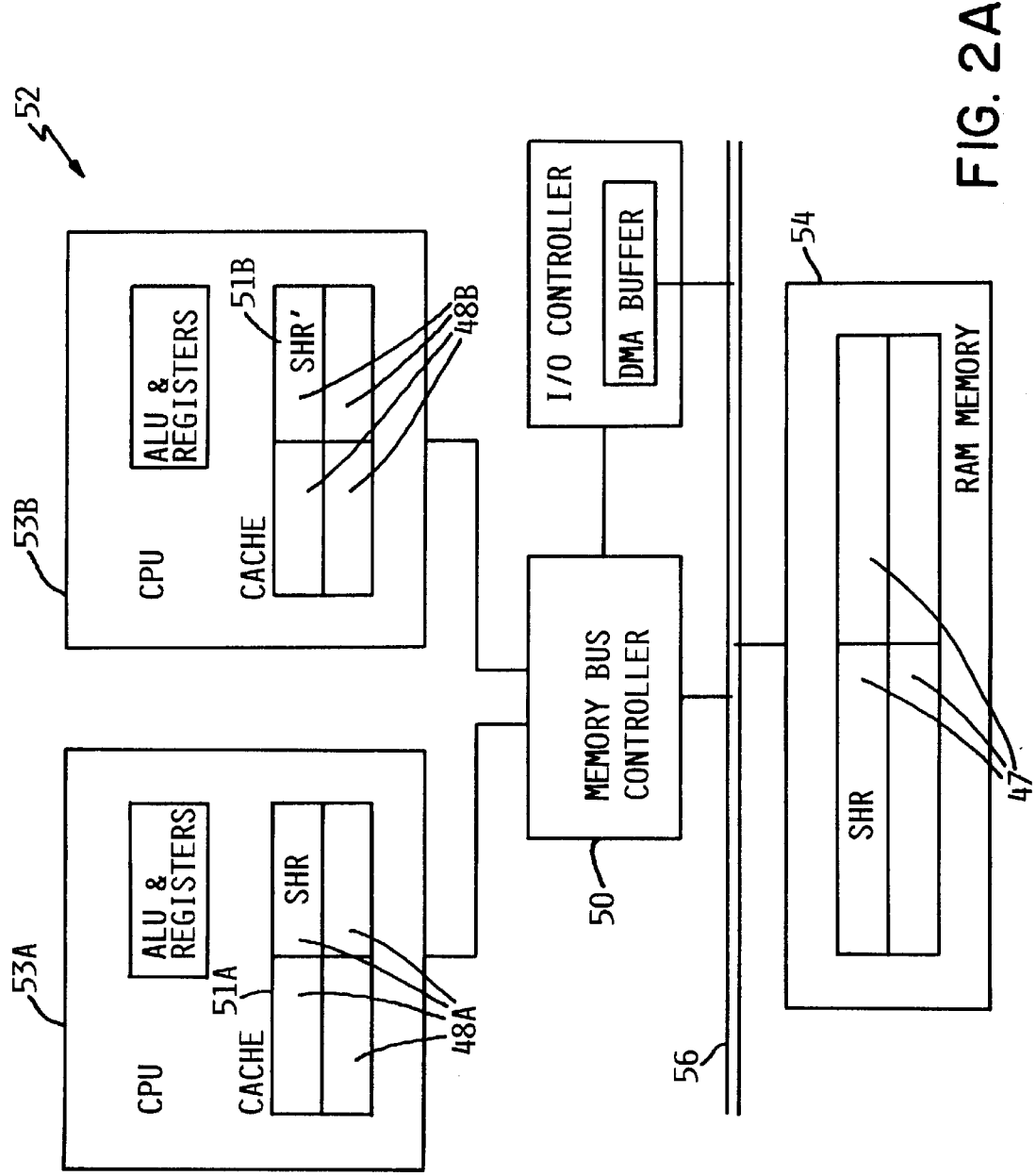

SAFE STRENGTH REDUCTION FOR JAVA SYNCHRONIZED PROCEDURES

TECHNICAL FIELD

The present invention relates generally to a method and system of enabling multiple executing computer instructions to view a shared resource. More particularly the invention relates to a method and system for enabling multiple threads running in a Java computer language environment to view a shared object.

BACKGROUND

In recent years a new programming language called Java has been developed. Applications written in Java can be executed in many different computer architectures, generally referred to as hardware platforms. The platform independent characteristic of Java applications is obtained by compiling the source code to a form that is platform, or machine independent. Generally, most compilers generate machine code that is machine dependent and can only execute on a specific computer architecture. In contrast, the Java compiler generates an intermediate form of "pseudo-code" generally called "byte-code."

The Java byte-code does not require a specific computing-platform architecture and is therefore capable of executing in many different computers. Because Java's byte-code is platform independent it is ideally suited for usage in a computer network environment. In a computer network, a stream of byte-codes can be transmitted from a remote computer or server to a local computer where the byte-codes are recognized, compiled and executed.

In order for the local computer to execute the byte-code, it must be Java-enabled. In other words, in the receiving platform, the byte-codes must be interpreted by a Java Virtual Machine (JVM) or, a just-in-time (JIT) compiler. The stream of byte-codes are compiled line-by-line to a machine code that is recognized by the local hardware platform while the Java application is running. This method of compiling is also known as dynamic compiling. Java also supports static compiling, in which the entire Java source code application is compiled to a specific hardware platform machine readable code all at once.

Computer systems are generally able to execute multiple tasks or processes at the same time. Processes that are executing simultaneously are part of an overall active program executing in the memory of the computer. The concept of executing multiple tasks or processes also extends to Java. In Java, threads are similar to processes, however, whereas processes execute in a completely separate application, threads execute with an application. The thread mechanism enables modern computers to execute a variety of concurrent tasks.

Another characteristic of threads is that they share resources, such as memory, with all other threads executing with the current application. Sharing computer system resources by concurrently executing threads may lead to interference between the threads. In multithreaded Java applications problems may arise when multiple threads attempt to share the same resource, such as an object. Because threads run independently of each other they can interfere with other thread's operation during the execution of complex instructions.

To address the problem of multiple threads executing and attempting to read or write to shared resources, the execution of the multiple threads must be synchronized. Synchronization allows multithreaded environments to apply locks on shared resources so that only one thread may have exclusive access of the shared resource at any given time. The other threads are then paused until the controlling thread releases the lock(s) to the shared resource(s).

Accordingly, Java uses a relatively simple strategy to resolve resource contention between threads by implementing a synchronized operation between the multiple threads that share resources. Namely, Java adds a "synchronized" keyword to a given object for the associated method. When an object is marked with a "synchronized" keyword, its contents cannot be changed other than by the currently invoked synchronized method. By inference this process requires all methods of a class, with some rare exceptions, to be synchronized, lest they view portions of the object in an unexpected state.

Synchronized methods within a class may be labeled or tagged with the keyword "synchronized.", Threads that would like to access shared objects are queued and only one thread at a time can execute "synchronized" methods. By adding the keyword "synchronized" to a method definition, when a thread invokes a synchronized method on a particular object it automatically obtains a lock for that object. Accordingly, any other thread that attempts to invoke the same, or other "synchronized" method for that object, must wait until the current thread releases the lock for the object. The only time a lock is released is when the thread exits the "synchronized" method. Only one thread at a time can execute "synchronized" methods. The Java language automatically manages all the locking and queuing activities occurring during execution.

In other words, Java controls the execution of the various threads and blocks concurrently executing threads from executing a "synchronized" method whenever another thread (usually the first one to gain access) invokes the "synchronized" method. As soon as one thread invokes a "synchronized" method, all other concurrently executing threads are blocked from executing the "synchronized" method. Whenever the current thread finishes the execution of the "synchronized" method it releases the lock and all other threads will be allowed to execute the "synchronized" method. Threads that are waiting to execute a "synchronized" method are queued.

Taken as a language keyword and a definition, this type of synchronization provides exclusive access to the object by a thread during the entire execution duration of the method. This method of operation maximizes contention for resources between the threads since only one thread at a time can view the object (e.g., until the thread releases the lock to the object). Such contention is a drawback to using the Java language in a multithreaded environment because since the entire purpose of threading (e.g., having a program perform more than one task at the same time) may well be defeated if there are multiple threads waiting for locks to be released before they can access shared objects. This is especially true if the threads that have halted execution merely require viewing the contents of the locked object without necessarily modifying the object.

In other programming languages, it is known that if a given method does not attempt to change an object, then the programmer may manually obtain a "weaker" class of lock on the object via suitable coding. This weaker class of lock allows an arbitrary multiple number of threads to simultaneously view an object provided the threads were invoking "immutable methods." As used herein, the term immutable method refers to a method which does not change an object. Allowing immutable methods to view otherwise locked objects can be referred to as a "shared read lock." In other words, methods that do not attempt to change an object are given permission to view or "read" the object.

On the other hand, methods that change the object ("mutable methods") would still require an exclusive type lock. Forcing mutable methods to obtain exclusive locks can be referred to as an "exclusive write lock." In other words, only the single thread possessing an exclusive lock on a particular object may modify or "write" to the object.

Implementation of this locking technique requires one lock to have two states; a "shared read" state and an "exclusive write" state. In this manner of implementing a lock function, it is implied that possession of the "exclusive write" lock excludes all other threads from obtaining access to a "shared read" lock. This implementation is well known in the art as "read by many, write by one" or "shared/exclusive locks." Such schemes are used, for example, in the computer systems having the designations S/38 and AS/400, which are manufactured by International Business Machines Corporation (IBM), the assignee of the present invention.

In view of the foregoing, it can be seen that in the Java programming language there is a need to allow multiple independent and concurrently executing threads to view a shared resource or object if such threads invoke synchronized methods that do not attempt to modify the contents of the shared resource or object. Such method and system to implement the foregoing preferably preserve the Java language semantics, in particular, the appearance of an exclusive lock for all methods using the "synchronized" keyword.

SUMMARY

According to one embodiment of the invention, a computer implemented method of minimizing contention for a shared resource between a plurality of processes executing computer instructions that are associated with said shared resource is provided. The method analyzes at least one of said processes of computer instructions and determines if at least one of said processes modifies said shared resource. If at least one of said processes does not modify said shared resource, the method automatically provides access to said shared resource by at least one said process.

According to another embodiment of the invention, a system for minimizing contention for a shared resource between a plurality of processes executing computer instructions that are associated with said shared resource is provided. The system comprises a computer memory for storing said shared resource and a host processor associated with said computer memory for analyzing at least one of said processes of computer instructions. Said host processor executes a first code segment for determining if at least one of said processes modifies said shared resource. Said processor executes a second code segment that controls access to said shared resource by said process if at least one of said processes does not modify said shared resource.

According to yet another embodiment of the invention, a program storage device readable by a computer system is provided, the program storage device tangibly embodying a program of instructions executable by the computer system to perform a computer implemented method of minimizing contention for a shared resource between a plurality of processes executing computer instructions that are associated with said shared resource. The method analyzes at least one of said processes of computer instructions and determines if at least one of said processes modifies said shared resource. However, if at least one of said processes does not modify said shared resource, the method automatically provides access to said shared resource by at least one said process.

According to another embodiment of the invention, a method of transmitting a program product to a computer system is provided. The method comprises: (a) establishing a connection with the computer system; and (b) transmitting the program product being executable by the computer system to perform a computer implemented method of minimizing contention for a shared resource between a plurality of processes executing computer instructions that are associated with said shared resource. The method analyzes at least one of said processes of computer instructions and determines if at least one of said processes modifies said shared resource. However, if at least one of said processes does not modify said shared resource, the method automatically provides access to said shared resource by at least one said process.

These and various other features as well as advantages of the present invention will become readily apparent to those skilled in the art from the following detailed description and corresponding drawings. As will be realized, the invention is capable of modification without departing from the invention. Accordingly, the drawings and description are to be regarded as being illustrative in nature, and not as restrictive.

BRIEF DESCRIPTION OF THE DRAWINGS

In the Drawings like parts are referenced by like numerals throughout the several views.

FIG. 2A is a functional block diagram illustrating a shared resource in a multi-processor computer system.

DETAILED DESCRIPTION

The principles of this invention apply particularly to overcoming the problem of locking of shared resources in the Java programming language when running in a multi-threaded environment. The present invention relates generally to a method and system, in the Java programming language, of enabling multiple independently executing Java computer instructions to view a shared resource. This function is provided by implementing a new function for reducing the strength of the synchronization feature in Java. The function enables multiple threads to view a shared object provided that the multiple threads do not attempt to modify the contents of the object.

Figure 1:
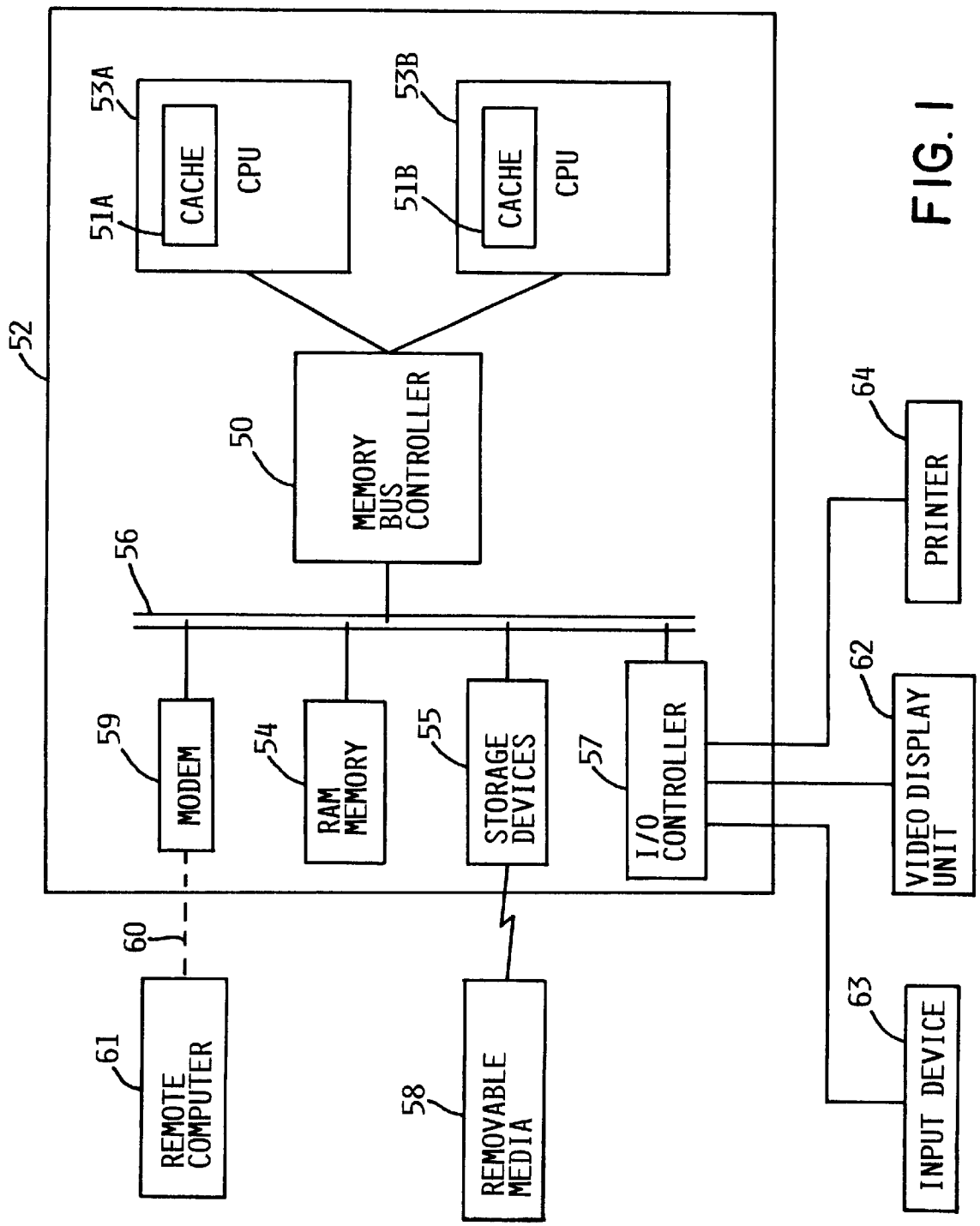
FIG. 1 is a functional block diagram of a multi-processor computer system forming the environment in which the present invention may be employed.

A further description of the present invention will now be deferred pending a brief description of the multi-processor computer system illustrated in FIG. 1 in which the present invention may be employed. Multi-processor system (MP system) 52 is available in a wide variety of available computer systems, which includes computer systems based on chips such as the Intel Pentium family or the PowerPC family of processors. Typical operating systems include the Windows '95, the Macintosh, or the OS/400 operating systems. Other alternatives include simplified environments such as a Personal Digital Assistant or even a consumer electronics device having a minimal operating system. All that is required is one or more CPUs 53, a memory bus controller 50, memory bus 56, and RAM memory 54.

The CPUs 53 may include optional caches 51. When caches 51 are present, they hold arbitrary fragments of the underlying RAM storage 54. The multi-processor computer system 52, in accordance with the principles of the present invention, includes an organization where 128 byte chunks called "cache lines" retain cached copies of main storage.

The first address of each byte is on a 128 byte boundary of some storage the programmer views as being held in RAM memory 54. It will be appreciated that sizes other than 128 bytes are possible. There also may be some form of "read only random access memory" ("not shown") that operates similarly to RAM memory 54, with the exception that ROM memory cannot be altered. These schemes and relationships are well known in the art.

It will be appreciated that since computers are not ends in themselves, some communication of the computer system so far described to some other device is typically required. Such a device, commonly called an Input/Output (I/O) Device, typically connects to the system in one of two ways.

In a first embodiment, the device directly communicates with memory bus 56. As such, it may interact in a variety of ways that are well known in the art with memory bus controller 50, RAM memory 54 and in some embodiments, the optional CPU caches 51 via memory bus controller 50. Illustrative examples of this embodiment are given in the diagram by Modem 59, which might provide communications with a remote computer 61 via a communication link 60, and storage device(s) 55.

In a second embodiment, the logic for I/O Devices to manage the relationships within Multi-Processor system 52 is placed in one or more devices in I/O Controller 57. I/O Controller 57 manages the relationship between RAM memory 54, the memory bus 56, the memory bus controller 50, and any relationships with CPUs 53 and their caches 51.

I/O Controller 57 would provide one or more alternative communications known in the art so that I/O Devices could attach without knowing the internal details of Multi-Processor system 52. Those skilled in the art will appreciate that there may be provided industry standard means such as SCSI or GPIB to ease attachment of I/O Devices and provide appropriate means for translating industry standard means to the requirements of Multi-Processor system 52. Examples of devices connecting via this second embodiment are shown by Input Device 63, Video Display Unit 62 and Printer 64. Whatever strategy is used to connect to Multi-Processor system 52, the functions of the various I/O Devices may vary extensively. For example, the Video Display Unit 62 might be a unit employing cathode ray tube pixel-based display, an ordinary "dumb" terminal such as a VT100, or a limited size, pixel-based LCD display. The input device might be as simple as an ordinary switch or as complex as a CAT scanner. However, as will be appreciated by those skilled in the art, means of attaching I/O devices other than those described herein can be used.

As stated above, whenever a thread invokes a "synchronized" method on a given object it automatically obtains a lock for that object. Any other thread that tries to invoke the "synchronized" method, or any other "synchronized" method for that object, while another thread holds the lock for that object, must wait until the lock is released. The lock is released when the thread holding the lock exits from the synchronized method. At any given time, only one "synchronized" method is permitted to execute on a given object. This functionality is built into and managed by Java.

At the language level synchronization is invoked by placing the keyword "synchronized" in front of a method. Synchronization is the process of queuing and orderly arranging the execution of concurrent threads such that only one thread can invoke a "synchronized" method that executes on an object.

With no synchronization, threads carry out operations at erratic and unpredictable times. Execution timing of each thread largely depends upon the operating environment. Furthermore, if multiple threads are executing, the order of their operations is unpredictable and if multiple threads operate on the same object, the status or contents of that object are unpredictable.

It will be appreciated that the Java programming language provides a notion of "immutable" objects. These types of objects can be changed only when they are first created. Once they are created, immutable objects are designed to never change state, thus their contents cannot be altered. Accordingly, one aspect of immutability allows the programmer to bypass synchronization because there is no need to synchronize a method if the objects it executes on are immutable or unchangeable.

The principles of the present invention extend the Java programming language concept of immutable objects to "immutable methods." More specifically, an immutable method may be defined as a method which can only read or view the data associated with an object it executes on, but which does not attempt to change or modify the data associated with the object, the object's class storage, or the class or object storage of other objects it knows about. Such methods are referred to as "accessor" functions.

Methods can be analyzed using either a Java compiler or a JIT compiler by looking at the code to determine whether a synchronized method directly or indirectly modifies a particular object it executes on. If the compiler or JIT determines that the method does not modify any object it executes on (directly or indirectly), such method can be termed an accessor function and may be allowed the shared form of access to locked objects.

Objects may be locked or unlocked by writing one of several variables into a status register which is associated with each object. An object's lock status register may reside in a memory space that is contiguous with the object. However, the status register may be referenced in a memory space that is non-contiguous with the object.

Changing the lock status of an object may be provided by assigning two levels of locking status to the object by storing the entity in the object's status register. These levels may be assigned by an entity, such as a variable, called a "lock" which is covertly associated with each object. The assigned entity allows "synchronized" methods access control to the object and is used by the generated code to implement the semantics of the Java programming language keyword: "synchronized."

Two active states of locking logic which may be assigned to the lock entity may be termed "shared read" and "exclusive write." In order to determine which state of lock is assigned to an object, the Java code itself must be analyzed.

In one embodiment of the present invention, the Java code is analyzed during the compilation of the source code by the Java compiler. The Java compiler makes the determination as to whether a method can be termed an accessor function and then marks or tags that function accordingly. It will be appreciated that methods for marking or tagging functions are well known in the art. Marked or tagged methods that qualify as accessor functions are now able to view or read objects that they previously would have been locked out of.

In another embodiment of the present invention, an incoming stream of Java byte-codes is during a JIT compilation process. The JIT compiler analyzed analyzes each "pseudo-code" or byte-code to determine whether a particular method in the byte stream can be tagged as an accessor function. Since either a static Java compiler or a JIT compiler generates code, including locking code specific to that platform, a recursion technique must be used to determine whether the current method directly or indirectly modifies any objects it executes on. The recursion technique is described in detail in the description of FIG. 3.

There are several possibilities associated with assigning a locking status which are described next below.

First, if the current method is a "synchronized" method, the static/JIT compiler proceeds to analyze it.

Second, if the method is a simple "leaf" routine (e.g., a program that calls no other program), then the static/JIT compiler analyses only the current method/routine.

Third, the method may invoke other routines. Here it is determined through a recursion process whether: (a) the other routines access the shared resource or object and (b) the other functions are also merely accessor functions or are functions which may attempt to change any object or class variable while executing under the locked object.

FIG. 2A generally illustrates Multiprocessor System 52 including multiple CPUs 53, with each CPU including caches 51 under cooperative control of the CPUs 53 and the Memory Bus Controller 50. Particularly, the caches contain individual cache lines 48A and 48B that represent 128 byte units of storage 47 in RAM Memory 54 starting on 128 byte address boundaries. RAM memory 54 communicates directly with memory bus controller 50 via memory bus 56.

Figure 2B:
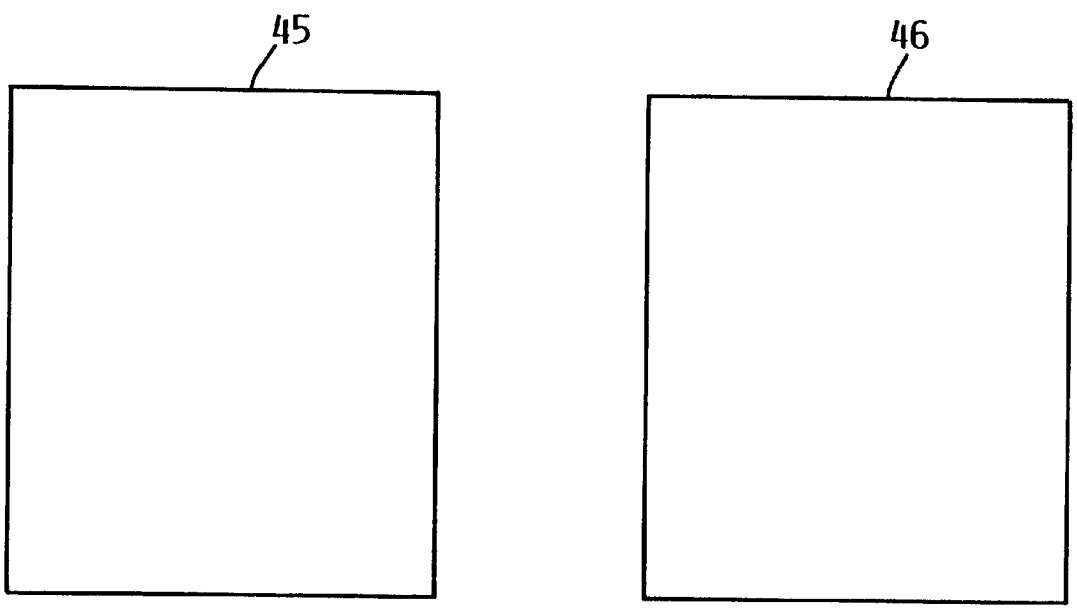
FIG. 2B is a functional block diagram illustrating two concurrently executing threads.

Turning now to FIG. 2B, execution threads t1 and t2 are implicitly shown. t1 is shown as executing code block 45 and t2 as executing code block 46. While they may or may not be assigned to the same processor, in one embodiment of the present invention, it is presumed that these threads are executing in different processors; thread t1 executing in processor 53A and thread t2 executing in processor 53B.

To implement locking facilities, there must exist the ability to "atomically" alter storage relative to all processors in the configuration. One example of such functionality is an instruction or function known as "compare and swap." This function has the following properties:

compswap(target, source, compare);

1. All other processors are prevented from changing "target" for the duration of the execution of the function, which includes this step and the two following steps. The "target" must represent a memory storage location. Whether "source" and "compare" are registers instead of a memory storage location is machine dependent.

2. The current contents of "target" is compared to the value "compare." If "compare" equals "target" then the contents of "target" is changed to be the same as "source."

3. All processors' next reference to "target" will show the new contents.

Turning to FIG. 2A, the "SHR'" value contained within cache 51B of processor 53B is shown to partly illustrate these steps. If thread t1 executing in processor 53A is successfully changing "SHR" with a compswap( ), then the prior value, SHR', in thread t2 is in the process of being removed from thread t2's cache 51B.

Compare and swap is well known in the art, for example, computer systems having the designations IBM 370 have provided it as an instruction. Other architectures, such as PowerPC, specify how to construct compswap( ) from even simpler primitives.

Those skilled in the art will appreciate that the implementation of primitive locks from functions such as compswap( ) is well known in the art. All software undergoes a process of translation or interpretation which reduces it to primitive operations capable of being performed by the "hardware." For example, typical means have structured storage called a "lock" that includes a variable used such as "SHR." The variable "SHR" always contains either all zeroes or a nonzero thread identification (ID). Whenever the value of "SHR" is nonzero, the primitive lock is being held by that thread with that nonzero ID.

Once the primitive lock is held by a given thread, other storage can be associated with the lock besides the variable "SHR." Specific embodiments of the invention may include lock states such as "Unlocked," "Shared Read," "Exclusive Read" and may also include the number of threads currently sharing the lock for "Shared Read." Either directly associated with the lock, or shielded via operating system primitives, a list of waiting threads which have yielded execution for lack of "owning" the lock may also be maintained. These threads that are waiting are dispatched from the queue when the lock is freed. By properly using compswap( ), a lock may be readily implemented that is capable of switching state between "shared read," "exclusive write," and "unlocked."

Those skilled in the art will appreciate that the Java programmer will not see the complexity of the environment of the present invention. By specifying "synchronized" as a keyword, the Java programmer expects that the underlying Java Virtual Machine (JVM), code generated by a compiler, or JIT implemented JVM functions, will generate the appropriate locking sequences for a given machine. This includes compswap( ) either directly in-line or via library calls.

A compiler or JIT may enhance its services on behalf of the "synchronized" keyword. However, the JIT/Compiler has complete control of the code generated and the representation of the underlying lock. The underlying services merely have to ensure that the Java programmer receives the expected synchronization.

It will be appreciated that the simplest "accessor" functions consist of a single statement and often appear in the same format as the example code stream set forth in the following TABLE 1.

TABLE 1

```
class PayrollObject {
    synchronized double getCurrentHourlyWage( );
/*currentHourlyWage is a variable in the object*/
    {return    currentHourlyWage;
        }
    }
```

In this case, the analysis of the resulting code stream is not difficult and the shared read lock logic may be used in the code generated by the Java/JIT compiler. That is, the lock is obtained, set to shared read state, and released to either "unlocked" or "shared read" state when the method getCurrentHourlyWage( ) completes execution, as dictated for example, by other remaining "shared readers."

Another more complex "accessor" function is illustrated in the example code stream set forth in TABLE 2.

TABLE 2

```
class PayrollObject {
    synchronized double calculateStatePayrollTax(USState obj) {
        return obj.TaxRate (currentHourlyWage));
/*TaxRate( ) is another function*/
        };
}
```

In this second example, the compiler has to determine whether calculateStatePayrollTax( ) modifies the shared object, and it must also determine whether the functions of several other objects modify the shared object. For example, USState is a parent object representing fifty various "state" objects. For these fifty "state" objects, the compiler will analyze each calculateStatePayrollTax( ) method to determine which functions they call and subsequently analyze them as well.

Figure 3A:
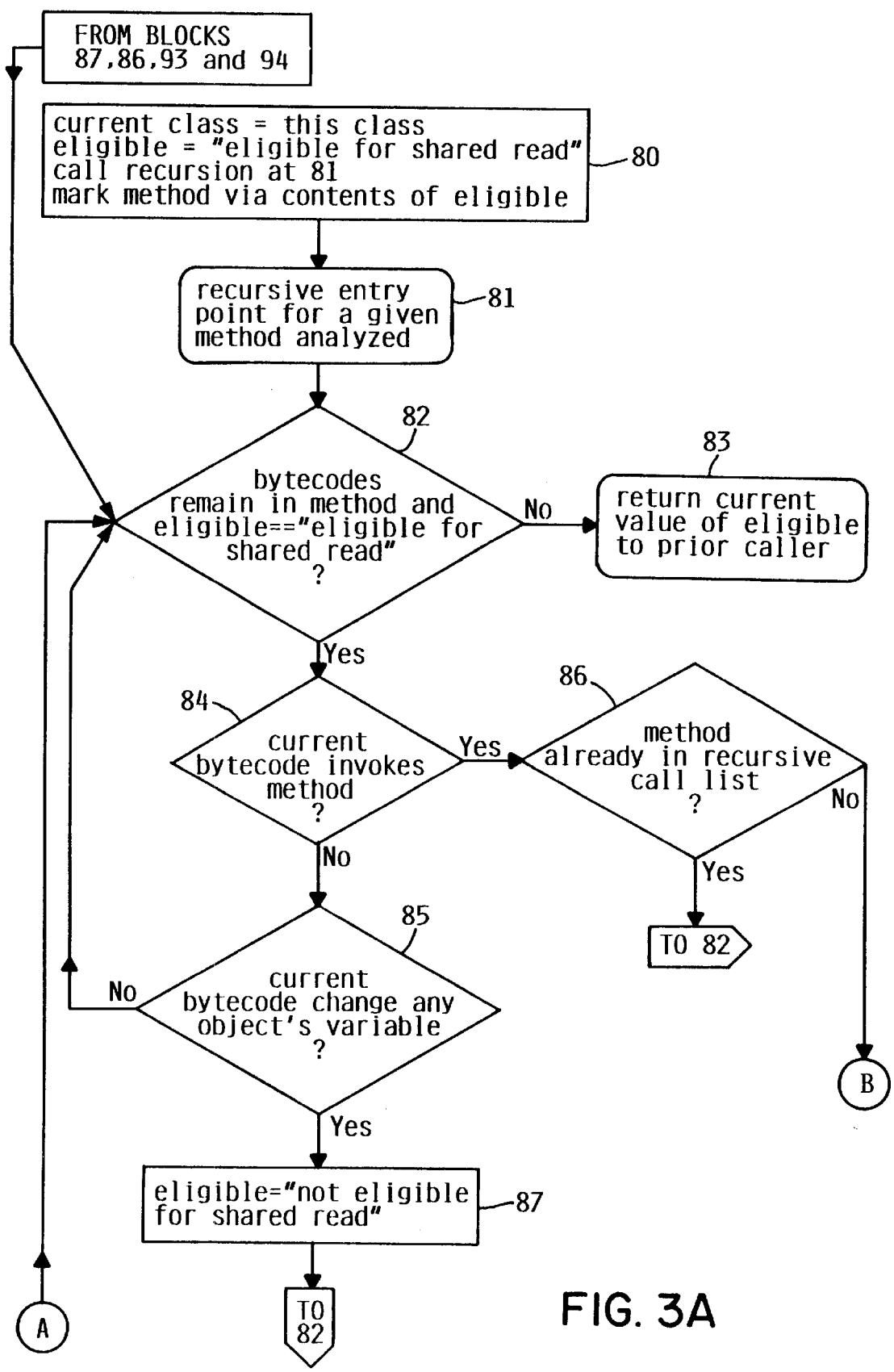
FIG. 3 is a logic flow diagram illustrating the steps utilized to implement one embodiment of the present invention.
Figure 3B:
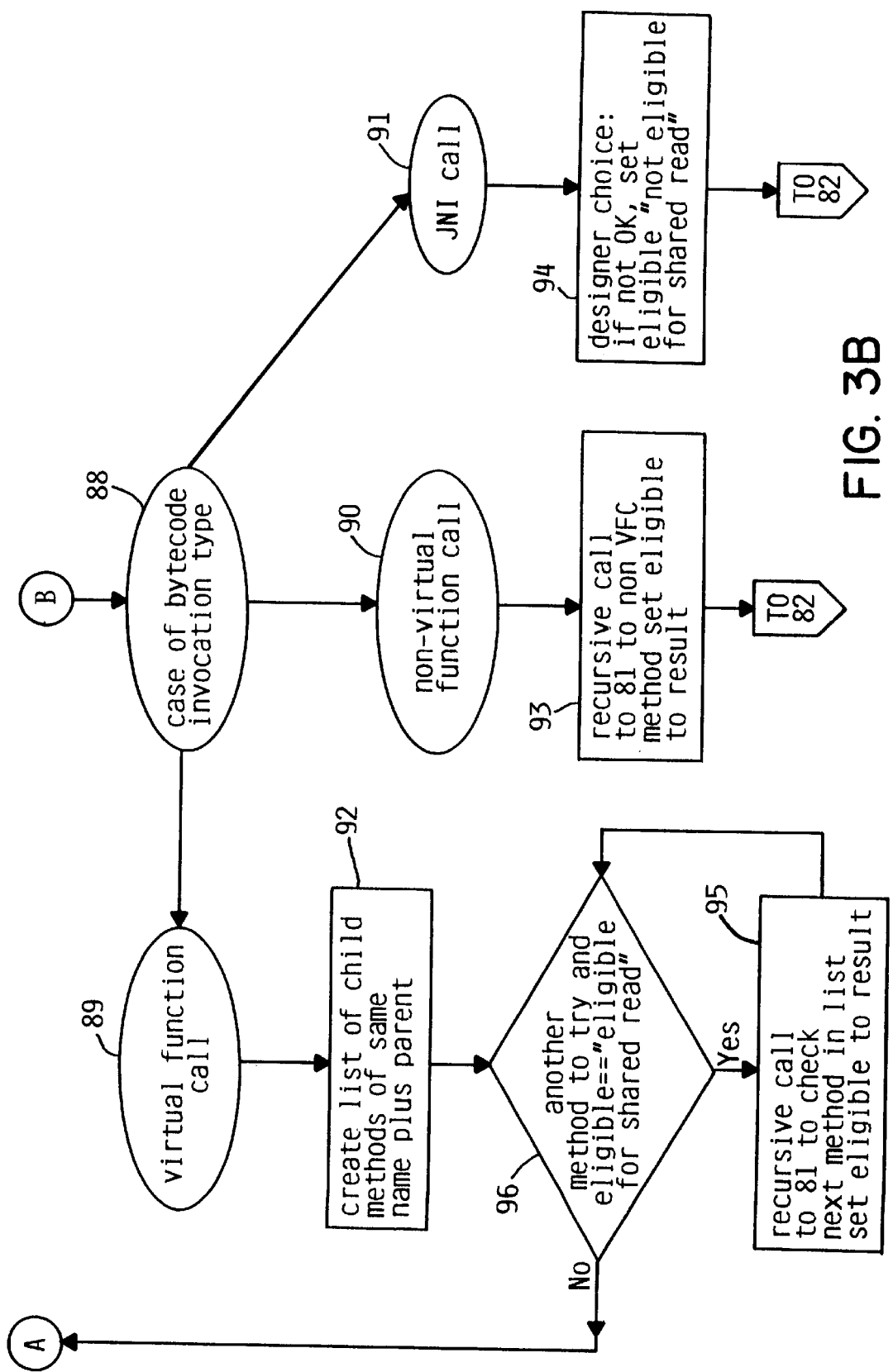

The compiler continues analyzing the functions recursively (as illustrated in FIG. 3) until all the functions that the calculateStatePayrollTax( ) function calls in each of the fifty variants is analyzed. Accordingly, the level and extent of the analysis will vary based on the complexity of the functions, objects and methods called.

As an optional function (e.g., in order to reduce overall complexity), the Java/JIT compiler may be designed such that it elects to abort analysis of complex scenarios. For example, the Java/JIT compiler may define a particular analysis cut-off point and then quit. The cut-off point being a predetermined: number of instructions, time-out period, number of methods analyzed, etc. By doing so, the Java/JIT compiler will assume that the object is modified and therefore obtain the exclusive lock for the object. However, this scenario is generally undesirable because the more complex functions retain the locks for a longer period, and thus holding up execution of the other threads for a longer period until the lock is released. Nevertheless, aborting the analysis of complex functions may be a practical necessity to preserve the original meaning of the "synchronized" keyword. If the JIT/Compiler cannot be sure, it must implement mutable semantics whether the code changes the object or not.

It will appreciated that the term for an exclusive lock is referred to as an "exclusive write," that term is defined as the capability of writing, not necessarily an actual "write" to the object.

It will also be appreciated that the Java/JIT compiler must make particular assumptions regarding the functionality of certain Java Native Interfaces (JNIs). A JNI is equivalent to an assembler routine. Here, the compiler may not be able to determine/know what a JNI does or what it can potentially do. Nevertheless, there are situations where enough sufficiently simple accessor methods exist to justify the optimization as described herein.

Furthermore, this particular type of optimization may be used selectively because of the added overhead associated with managing shared read and exclusive write states of locks. The added overhead is required because the shared read state may be granted more than once and the exclusive write lock status cannot be granted until all read state threads free the lock.

In a further optional embodiment of the present invention, the compiler marks each class during the compilation process. This method requires that the optimization be established as a choice on the "Java" command. For example, providing a choice between a simple or a shared/exclusive type of locking. The optimization may be enhanced even further by allowing a list of specific classes to perform a shared/exclusive type of locking. For the variety of server programs that would require the added scalability of shared read/exclusive write locking, this added specification will not necessarily hinder its use.

Table 3 is an annotated example of Java source code that includes covertly marked statements showing the results of analysis.

TABLE 3

```
class PayrollObject {
    double currentHourlyWage;
    synchronized double getCurrentHourlyWage( ) {
        return currentHourlyWage; };/* eligible, simple accessor */
    synchronized double calculateStatePayrollTax(USState obj) {
        return obj.TaxRate (currentHourlyWage); };/* ineligible (see
USState) */
    synchronized double calculateStatePayrollTaxAlternate(USState
obj) {
        return obj.TaxRateAlternate(currentHourlyWage); };/*
ineligible (see Minnesota) */
    synchronized double figureEstimatedSocSecTax ( ) native; /*
policy call (see text) */
    synchronized void changeHourlyWage(double newwage) {/*
ineligible, changes var */
        currentHourlyWage=newwage; };
};/* end PayrollObject */
class USState {
    static int invocation_count;
    public double TaxRate(double curhrwage) {
        invocation_count-+; /* anyone calling this need excl. write
*/
        return curhrwage*this_constant*that_constant/other_constant;
    };
    public double TaxRateAlternate(double curhrwage) {
        return curhrwage*this_constant*that_constant/other_constant;
};/* End USState */
class Minnesota extends USState {
    int minn_invocation_count;
    public double TaxRateAlternate(double curhrwage) {
        minn_invocation_count++; /* anyone calling this need excl.
write */
        return curhrwage*this_constant*that_constant/other_constant;
};
};/* end class Minnesota */
```

Ordinarily, the source code in TABLE 3 would be read as two separate class files prior to the compilation process. It will be appreciated that in the JIT circumstance, the presumption is that both files would be available at the time the JIT process begins.

Java permits dynamic class loading, so that the second class might be made available after the first file was processed by a JIT compiler. In the case of most static compilation technologies, all class files must be available at the commencement of compilation. In other words, static Java compilers tend to prohibit the dynamic class load feature. This exception is well-documented by such compilers. It will be appreciated, however, that this exception is not burdensome to users of static compilation in Java who retain the alternative of a JVM/JIT approach as may be required.

The JVM specification does not require a specific class file format, however, most JVMs follow the example format of the Sun Microsystem's implementation. Accordingly, the "synchronized" keyword can be regarded as an attribute associated with a Java method, but not part of its formal signature. Explicit byte-codes for performing the lock/unlock functions might not be present in the byte stream of a synchronized method. Therefore, the synchronizing functions for seizing the lock must be logically inferred and commenced before the first byte-code has any code executed and, at the end of such method code. This type of logical insertion is well known in the art. However, a decision is made whether to insert a sequence that gets a shared read or exclusive state of the said lock.

Determining what code to generate, shared read versus exclusive write, is most easily described by defining a separate "pre-pass" over the byte-codes of a method undergoing compilation or JIT. Referring now to FIG. 3, a given method within a class is analyzed at block 80, its class is set to "current class" and the method under analysis is set in the current method. Still at block 80, a variable called "eligible" is set to "eligible for shared read lock" and invokes the first instance of a recursive routine starting at block 81.

Block 81 sets a local variable called "eligible" and initializes it to "eligible for shared read locking." That value will be returned to the caller (the caller will set that value into its own local copy of "eligible"). The checks at block 82 iterate on the byte-codes in the current method while eligible remains "eligible for shared read." When the iterations are complete, or when the value of eligible changes, the current recursion returns to the caller via block 83. If there are byte-codes remaining in the current method and eligible remains "eligible for shared read," the process moves to block 84. At block 84, byte-codes are checked and separated into those which invoke other methods and those that do not. Byte-codes which do not invoke other methods are examined at block 85. If the byte-code modifies any class or object variables from any class, then the local variable "eligible" is set to "not eligible for shared read locking" and that value is returned up to the prior recursive caller via blocks 87, 82 and 83. Byte-codes which do invoke other methods are examined at block 86. If the method is already in the recursive call list, execution jumps to block 82. Otherwise control is passed block 88. A recursive call chain, which is a list of byte codes that invoke other methods, is generated by the process in parallel to the recursive calls facilitating the determination of which byte-codes do invoke other methods.

In one embodiment of the present invention, block 85 would notice the variable modification case in the changeHourlyWage( ) function in TABLE 3 and proceed to block 87. Otherwise, at block 82 iteration moves on to the next byte-code. The byte-codes which invoke other methods are initially examined at block 84. Subsequently, the name of the method is checked to see if it was the subject of other recursive calls. This is done by "running" a chain of previous calls created as part of the recursion. If it was present in any prior call, including the lists created at block 92 in any prior call, processing iterates to the next byte-code at block 82 without any further consideration. There are three remaining cases represented by the case structures at blocks 88, 89, 90 and 91.

Case one, a non-virtual function call at block 90, is a nonpolymorphic method. This method type (known by byte-code), is checked recursively from block 93, resuming at block 81, by changing the current method to the newly discovered method, while keeping the current class the same. When that call returns from block 83 to block 93 at the current level, its result set as the value of "eligible."

Case two, a virtual function call at block 89, represents a polymorphic method. Here, not only is the current function called recursively, it is made part of a list, at block 92, which also includes each known "child," "grandchild," etc. of the specified method name, i.e. those that override the current method's name in the inheritance tree. Accordingly, in blocks 95 and 96, all the methods in the list that are eligible in the current method remain eligible and the current method continues iterations at block 82. In addition, for a JIT approach, an additional value of "speculative" must be remembered on this pathway so that if a later dynamically loaded class contradicts the findings of the list processing, the JIT code can be reprocessed when the new class is loaded.

Thus, a list is formed and a short outer loop at block 96 arranges the recursive call at block 95 for each member of the list. As long as the result of each list member returns "eligible for shared read locking," execution continues. If the result ever fails to be "eligible for shared read locking," processing ceases and "not eligible for shared read locking" is returned to the caller. Examples of these types of failure cases are shown in TABLE 3. First, calcuateStatePayrollTax( ) fails because TaxRate( ) in "USState" changes a variable. Second, function calculateStatePayrollTaxAlternate( ) fails because the TaxRateAlternate( ) function of a child class "Minnesota" changes a object variable.

Case three, a Java Native Interface (JNI) or "native method" is call at block 91. For these, a policy decision at block 94 is required by the implementers. The simplest policy is to declare that use of a JNI renders the method under investigation "not eligible for shared read locking" and return this to the caller. However, those skilled in the art will appreciate that other alternative policies may be considered. For example, figureEstinWedSocSecTax( ) as given in TABLE 3. It seems unlikely to control shared, modifiable resources and it would be a shame to lock it exclusively.

It will be appreciated by those skilled in the art that, a JNI resembles an assembly language call and may control hidden resources. In accordance with the principles of the present invention, the ordinary decision for a JNI may be to assume that it does not modify the object and let it do its own synchronization logic. Such a decision would alleviate many conditions where the only reason to not do shared read locking is the presence of a JNI call.

However, there may be circumstances where exclusive locking of the object is prudent even if the JNI code does not modify the object. To the extent JIT or compiler designers make this choice, special keywords to override this choice become almost required. To the extent the presence of a JNI causes a compiler/JIT designer to make the conservative conclusion of retaining exclusive locking, it is less important as a feature. There also will be cases where the Java programmer relies implicitly (for performance, or to force one-at-a-time behavior) on exclusive locking even for a simple accessor type function. An added—exclusive write keyword, which forces exclusive semantics for any class in that keyword's list, may account for such uses via the "java" command. JVM designers (who provide the Java command) have the freedom to add keywords of their own design to their Java command.

Upon completion of the "pre-pass," and the last recursive call at block 83 execution returns to block 80, and a method is marked by the overall result as being "eligible" or "ineligible" for shared read locking and the code generation generates the locking sequences appropriately.

It will appreciated that for further control of the process, practical implementations might retain additional checks on the compile time cost, especially in JIT environments. Here, an overall recursion depth limit or total method call limit might also be enforced to limit the processing. In one embodiment, the present invention avoids the recursion altogether and declares any method containing other methods "ineligible for shared read locking." Accordingly, a lot of simple accessor functions may become "eligible." While "no recursion" as a limit may be preferred by a JIT compiler, the recursive method is likely to prefer static compilation. For example, when higher optimization is desired.

Those skilled in the art will appreciate the interrelationship of JIT and the generated code. It has generally been understood, in accordance with the Java specification, that the lock is associated with the instance of an object. However, the underlying primitive lock, i.e. the target of compswap( ), may not always be preferentially associated with the instance. When a primitive lock is held to set the more sophisticated lock state, that time is often brief compared to the total period in which a lock is held.

It will be appreciated, that the primitive lock might not need to be associated with something as fine-grained as the instance. For example, in a JIT environment, it might be useful to have the primitive lock associated with the class or some static entity associated with the method rather than an individual object instance. This may simplify the replacement of code if dynamic class loading presented a class which, had it been present originally, would have prevented shared read locking.

However, even with such class locking, if a dynamic class load situation actually occurs, ordinary static compilation in a JIT mode would produce errors. This is where the "speculative" attribute enters. In one embodiment the JIT generates code such that a class including "speculative" methods always uses a primitive lock associated with the objects class storage and not the instance of the object.

In a further embodiment, the JIT, itself, obtains the primitive lock when replacing speculative shared read code with exclusive write code. In the latter case, the JIT may compete for and hold a class-wide exclusive primitive lock to safely modify the code of any concurrently executing methods which were waiting for their turn with the lock. Furthermore, because they would be located at a known "wait" point on the primitive lock, they could be redirected to compete for an exclusive one. The JIT competes for the lock before making the newly loaded class available and hence avoids any incorrect results from having shared read semantics available when a newly loaded dynamic class method requires exclusive write.

Furthermore, the method "gives up" not only when the existing class' variables are changed but if any other classes' variables are changed by anything else that is called from within a method. It will appreciated that this covers cases where a coding of "synchronized" on an "outer" object was expected to control changes to an "inner" object that was not itself synchronized. Java permits inner "objects" to be synchronized as well, but efficient programmers may not prefer it, especially if "inner" designates "inner class."

It will also be appreciated that Java includes additional terms to "synchronized" for the class method label. For example, it also includes a "synchronized" keyword as well, that applies to a block of code for a reference variable of a specified class. However, those skilled in the art will appreciate that it is always possible, in principle, for such usage to have been provided as a method under the class described by the reference variable. Subtle differences exist, such as, providing a reference variable of a high level class like Object when a narrower range of classes is actually used, or by having to "break" encapsulation in ways that are not supported in Java if it were to be actually coded, rather than logically created as a pseudo-method by the pre-pass code.

However, such differences do not affect the operation of the algorithm. The reason is that the algorithm covers the children invocations of the same function while it also accounts for polymorphism. Thus, the synchronized block can always be treated as a method of the class specified by the object reference in parenthesis. It will also be appreciated that down-casting, whether in a synchronized method or in the synchronized block, is also accounted for since any change to any object or class declares the method (or synchronized block) ineligible for shared read semantics.

Java also has semantics for implicitly releasing and obtaining locks (wait( ) and notify( )). While appropriate code must be generated for them, they do not present any novel problems. Again, the difference being the kind of sequence to be generated to hold a lock free. However, Java obtains or releases locks and merely needs to look at the pre-pass status to decide how to generate code.

Finally, some JVMs may choose to intermix interpreted execution and JIT/static compiled execution. In one embodiment, the present invention allows the interpreted code to always lock exclusively and the non-interpreted code to perform shared read lock. It will be appreciated that this principle is acceptable as long as the semantics of the more complex lock allow for recursive lock holding. Java is already required to do this for its regular "exclusive" style of lock.

Therefore, it might be necessary (with or without interpreted cases) to "promote" an existing "shared read lock" to an "exclusive" one and then "demote" it back to a "shared read lock." Semantics for this well known type of locking exists in the art (for example, see Machine Interface of the IBM System/38) and would have to be part of the code generation. If the JIT implementation considered an "exit" to interpretation to be treated as "ineligible," then the algorithm as describe would not have that problem because the algorithm as stated ensures that all "interior" uses would be able to lock the object in the same way. Those skilled in the art will appreciate that in accordance with the principles of the present invention more complex embodiments than the illustrated example might attempt to hold "shared read locks" and promote them to "exclusive" depending on what was called.

The present invention has been described in its presently contemplated best mode, and it is clear that it is susceptible to various modifications, modes of operation and embodiments, all within the ability and skill of those skilled in the art and without exercise of further inventive activity.

Further, while the invention has been described in connection with what is presently considered the most practical and preferred embodiments, it is to be understood that the invention is not limited to the disclosed embodiments, but on the contrary, it is intended to cover various modifications and equivalent arrangements included within the spirit and scope of the appended claims.

What is claimed is:

1. A computer implemented method of minimizing contention for a shared resource between a plurality of processes executing computer instructions that are associated with said shared resource, said computer instructions being formulated in a computer language, the method comprising:

analyzing at least one of said processes of computer instructions, each said analyzed process invoking a lock of a first type on said resource according to the semantics of said computer language;

with respect to each said analyzed process, determining whether the respective analyzed process potentially modifies said shared resource; and if the respective analyzed process does not modify said shared resource, automatically modifying the behavior of said respective analyzed process to invoke a lock of a second type on said resource, said second type lock being less exclusive than said first type lock.

2. The method according to claim 1, further comprising:
analyzing a plurality of processes of computer instructions until all processes that are potentially associated with said shared resource is analyzed.

3. The method according to claim 1, wherein said analyzing step is limited to a predetermined measure of complexity, wherein if it is not possible for said computer to complete said analyzing step without exceeding said predetermined measure of complexity, said analyzing step is aborted, and it is assumed that the process being analyzed by the aborted analyzing step potentially modifies said shared resource.

4. The method according to claim 1, wherein said shared resource is a Java object.

5. The method according to claim 1, wherein said processes of computer instructions is a Java object method.

6. The method according to claim 5, wherein said Java object method is an accessor function.

7. The method according to claim 1, wherein said analyzing step is performed by a compiler.

8. The method according to claim 7, wherein said compiler is a Java compiler.

9. The method according to claim 7, wherein said compiler is a Just-In-Time (JIT) Java compiler.

10. The method according to claim 1, wherein the step of determining if said process modifies said shared resource includes determining if said process contains a lock on said shared resource.

11. A computer system for minimizing contention for a shared resource between a plurality of processes executing computer instructions that are associated with said shared resource, said computer instructions being formulated in a computer language, comprising:
a computer memory for storing said shared resource; and
a host processor associated with said computer memory for analyzing at least one of said processes of computer instructions, each said analyzed process invoking a lock of a first type on said resource according to the semantics of said computer language, said host processor executing a first code segment for determining, with respect to each said analyzed process, whether the respective analyzed process potentially modifies said shared resource, said processor executing a second code segment for automatically modifying the behavior of the respective analyzed process to invoke a lock of a second type on said shared resource if the respective analyzed process does not modify said shared resource, said second type lock being less exclusive than said first type lock.

12. A program storage device readable by a computer system, the program storage device tangibly embodying a program of instructions executable by the computer system to perform a computer implemented method of minimizing contention for a shared resource between a plurality of processes executing computer instructions that are associated with said shared resource, said computer instructions being formulated in a computer language, the method comprising:
analyzing at least one of said processes of computer instructions, each said analyzed process invoking a lock of a first type on said resource according to the semantics of said computer language;
with respect to each said analyzed process, determining whether the respective analyzed process potentially modifies said shared resource; and
if the respective analyzed process does not modify said shared resource, automatically modifying the behavior of said respective analyzed process to invoke a lock of a second type on said resource, said second type lock being less exclusive than said first type lock.

13. A method of transmitting a program product to a computer system, the method comprising:
(a) establishing a connection with the computer system; and
(b) transmitting the program product being executable by the computer system to perform a computer implemented method of minimizing contention for a shared resource between a plurality of processes executing computer instructions that are associated with said shared resource, said computer instructions being formulated in a computer language, the method comprising:
analyzing at least one of said processes of computer instructions, each said analyzed process invoking a lock of a first type on said resource according to the semantics of said computer language;
with respect to each said analyzed process, determining whether the respective analyzed process potentially modifies said shared resource; and
if the respective analyzed process does not modify said shared resource, automatically modifying the behavior of said respective analyzed process to invoke a lock of a second type on said resource, said second type lock being less exclusive than said first type lock.

14. The method of claim 1, wherein said lock of said first type is an exclusive write lock and said lock of said second type is a shared read lock.

15. The computer system of claim 11, wherein said computer language is Java, and said computer instructions are formulated in Java byte-codes.

16. The computer system of claim 11, wherein said lock of said first type is an exclusive write lock and said lock of said second type is a shared read lock.

17. The program storage device of claim 12, wherein said computer language is Java, and said computer instructions are formulated in Java byte-codes.

18. The program storage device of claim 12, wherein said lock of said first type is an exclusive write lock and said lock of said second type is a shared read lock.

* * * * *